April 9, 1963   F. W. KOHOUT   3,084,637
SAFETY DERAIL PREVENTER
Filed March 8, 1961
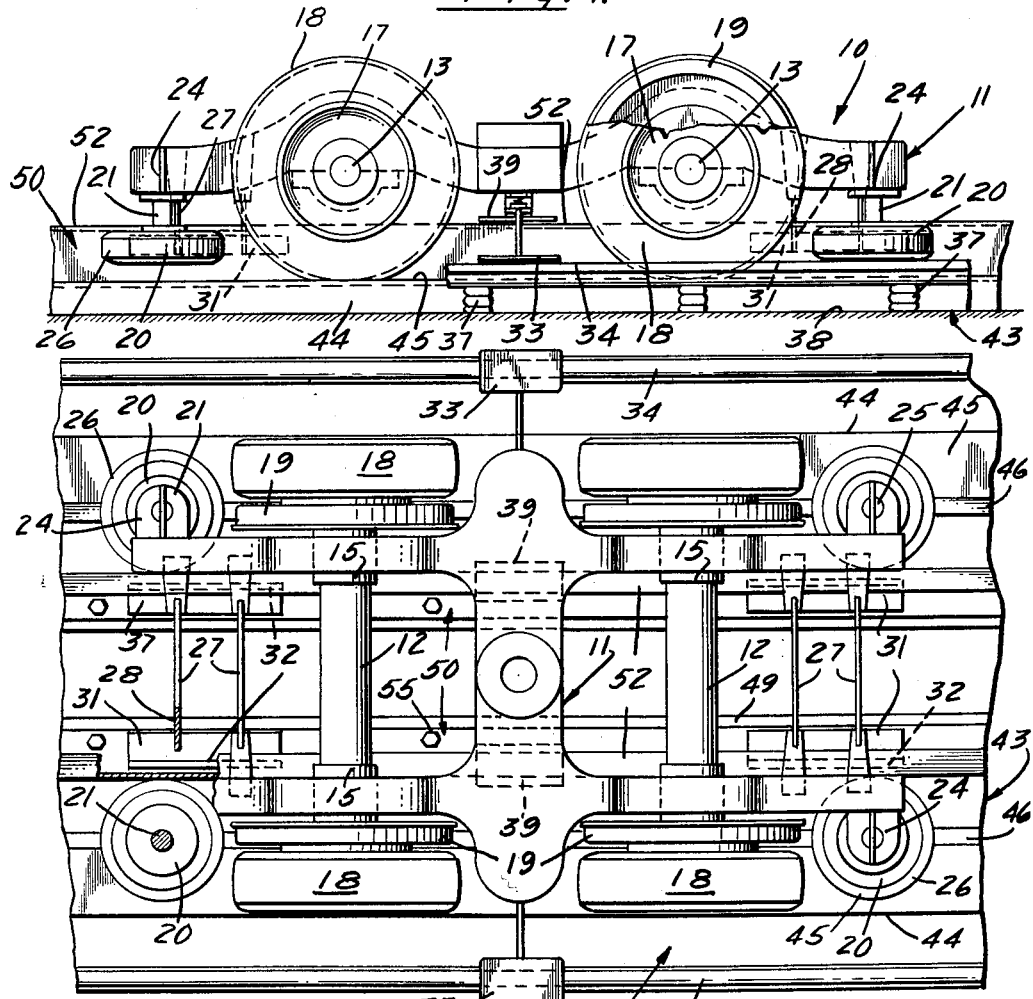
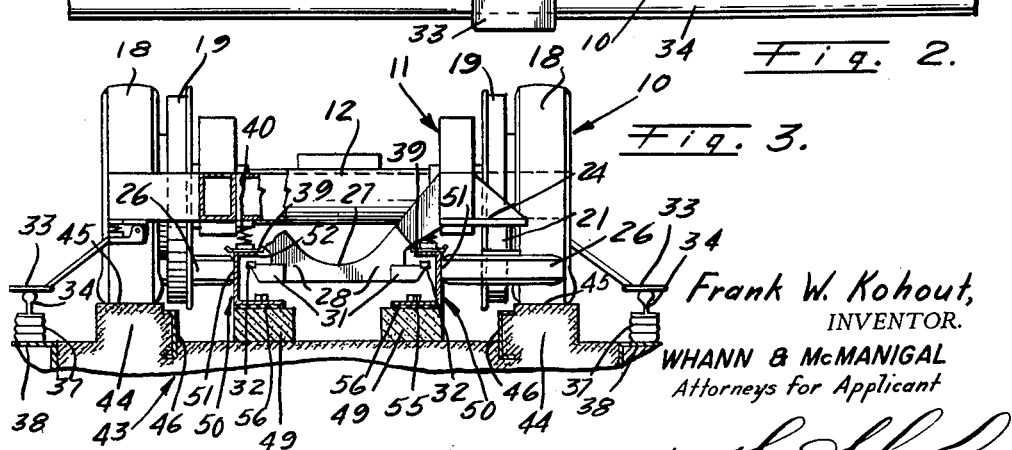
Frank W. Kohout,
INVENTOR.
WHANN & McMANIGAL
Attorneys for Applicant United States Patent Office 3,084,637
Patented Apr. 9, 1963

3,084,637
SAFETY DERAIL PREVENTER
Frank W. Kohout, Pacific Palisades, Calif., assignor to Daniel, Mann, Johnson & Mendenhall, Los Angeles, Calif., a corporation of California
Filed Mar. 8, 1961, Ser. No. 94,245
5 Claims. (Cl. 104—243)

This invention relates to a safety derail preventer and, more particularly, to a derail preventer for vehicles traveling on a flat track on a roadbed.

It is an object of the present invention to provide an improved derail preventer.

It is another object of the present invention to provide a derail preventer that performs the dual function of preventing rapid transit vehicle derailment during high speed operation and of acting as a part of the guidance system for the rapid transit vehicle.

It is still another object of the present invention to provide a derail preventer that has a braking action on a rapid transit vehicle when it starts to leave its track in the vertical direction.

It is a further object of the present invention to provide means in an electrically driven rapid transit vehicle to serve to limit the upward movement of the vehicle and to also serve as current return collecting rails.

It is a still further object of the present invention to provide a derail prevention device for a rapid transit vehicle and which aids in producing a quiet, comfortable, low-sway ride along with derail protection.

It is a still further object of the present invention to provide a derail prevention device for a rapid transit vehicle in which the device combines a vertical restraining force to hold the vehicle on the track and a braking action.

It is another object of the present invention to provide a derail prevention device for a rapid transit vehicle that positively prevents derailing likely to be caused by excess side wind loads, debris on the running surface, and overspeeding on curved track sections.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes only:

FIG. 1 is a fragmentary side elevational view of a vehicle truck incorporating the present invention;

FIG. 2 is a plan view of the vehicle truck illustrated in FIG. 1; and

FIG. 3 is an end view, partially cut away, of the truck shown in FIG. 1.

Referring again to the drawings, there is shown a 4-wheel truck, generally designated as 10, for supporting a portion of an electrically driven rapid transit vehicle. The truck is comprised of an H-frame 11 across which extend two axle housings 12 having therein axles 13. The axles are bearing mounted within the housings 12 and are adapted to be driven by a gear train, not shown. At each end of the axles is a main vertical wheel 17 fitted to rotate with the respective axle, and on each wheel 17 is a pneumatic tire 18. Immediately inwardly of each main wheel 17 is a flanged steel safety wheel 19 also mounted for rotation with the axle.

At opposite ends of the frame 11, outwardly of the main vertical wheels 17 and the safety wheels 19, are horizontal guiding wheels 20 bearing mounted on stub axles 21 which are, in turn, supported on horizontal arms 24 extending from the frame. On each wheel 20 is a pneumatic guide tire 26.

Inwardly of the rearward and forward ends of the H-frame 11 are electric motor mounts 27, and extending downwardly therefrom, towards each side of the frame, are a pair of hangers 28. Each pair of hangers 28 supports a transverse anti-derail bracket 31, and secured longitudinally on the transverse brackets are anti-derail braking shoes or bars 32 made of a non-galling metal, such as brass. Thus, for each truck, as shown, there are four braking bars 32.

Extending transversely outwardly from a central portion of the H-frame are positive current collectors 33, each adapted to make contact with its respective positive rail 34 so as to supply electric power to the motors adapted to be mounted on the mounts 27. The rails 34 are supported on insulators 37 which in turn are supported on brackets 38 on the roadbed. Centrally inwardly of the current collectors 33 are a pair of negative or return current collectors 39 supported from the frame 11 by springs 40, one collector being provided for each of the motors.

As may be best seen in FIG. 3, the roadbed, generally designated as 43, is shown to be of concrete, and spaced above it inwardly of the positive rails 34 are horizontally spaced tracks 44 of concrete, having flat upper surfaces 45 on which the pneumatic tires 18 travel. Inwardly of each of the surfaces 45 is an outwardly opening channel-shaped track 46 imbedded in the concrete. The tracks 46 are adapted to support a safety wheel 19 when a juxtaposed, corresponding pneumatic tire 18 becomes partially or completely deflated so that the running of the vehicle will not be interrupted. Because the actual supporting use of the wheels 19 would be seldom and of short duration, the tracks 46 may be made of relatively light steel.

Transversely inwardly of tracks 46 are a pair of parallel raised portions 49 of the roadbed and supported thereon, respectively, are a pair of horizontal guide tracks and negative rails 50. Each of the rails 50 is generally channel- or C-shaped and is inwardly open so as to receive the respective brake shoes 32 horizontally spaced from its vertical web member 51, and vertically spaced from its upper flange or negative rail member 52. Rails 50 are secured to raised portions 49 by bolts 55 and are spaced from the raised portions 49 by insulation material 56.

The horizontal guide tires 26 are spaced to ride on respective outer surfaces of the channel webs 51, so as to continually guide the vehicle as the vertical wheels travel on the flat track surface 45.

In operation, as the vehicle moves, receiving current through the positive current collectors riding on tracks 34 and having the return or negative collectors 39 riding on the upper flanges 52 to provide a current return to the power supply through the guide tracks 50, the guide tires 26 on the guide wheels 20 restrict the transverse horizontal movement of the vehicle as they ride on the exterior surfaces of the webs 51 of the guide tracks to not only safely hold the vehicle in its proper horizontal alignment on the track surfaces 45, but to also produce a quiet, comfortable, low-sway ride. Should there be a tendency for the vehicle to overturn, at which time the tires 18 of the vertical wheels 17 on one side of the undercarriage frame start to leave the running surface 45, then the non-galling shoe 32 on the same side will engage the undersurface of the corresponding upper flange 52, as may be clearly imagined from FIG. 3. Such a contact produces a metal-to-metal braking action, to reduce the vehicle speed, and to positively restrain the vehicle from leaving the running surface or surfaces 45.

It is clear that the vertical restraining force coupled with the braking action, to positively prevent derailing caused by excessive side wind loads, debris on the running surface, or overspeeding on curved track sections, may be shown in various other forms without departing from the inventive principles disclosed herein.

I claim:
1. In a railway structure of the type in which a vehicle travels on flat tracks on a roadbed, a derail prevention device comprising: a vehicle frame; vertical wheels bearing mounted on each side of said frame, said frame being adapted to travel in a forward and rearward direction on said wheels; a pair of spaced, allochiral, inwardly opening, channel-shaped rails secured on a roadbed between said vertical wheels and below said frame; a pair of allochirally arranged brake shoes extending downwardly from said frame, said rails being generally outwardly of said shoes, said shoes extending into respective channel-shaped rails under an upper flange portion thereof above the lowermost peripheral portions of said vertical wheels so as to provide a braking action when said frame is lifted a predetermined amount and to prevent the lifting of said frame beyond said predetermined amount; and horizontal side wheels disposed laterally of said frame on opposite sides thereof in contact with the outer sides of web portions of said respective channels for rotation thereon.

2. In a railway structure of the type in which a vehicle travels on flat tracks on a roadbed, a derail prevention device comprising: a vehicle frame; vertical wheels bearing mounted on each side of said frame, said frame being adapted to travel in a forward and rearward direction on said wheels; a pair of spaced, allochiral, inwardly opening, channel-shaped rails secured on a roadbed between said vertical wheels and below said frame; a pair of non-galling metal brake shoes extending downwardly from said frame, said rails being generally outwardly of said shoes, said shoes extending into respective channel-shaped rails under an upper flange portion thereof above the lowermost peripheral portion of said vertical wheels so as to provide a braking action when said frame is lifted a predetermined amount and to prevent the lifting of said frame beyond said predetermined amount; horizontal side wheels disposed laterally of said frame on opposite sides thereof in contact with the outer sides of web portions of said respective channels for rotation thereon; and an upper flange portion of said rails providing a return current collecting means, said rail being insulated from said roadbed.

3. In a railway structure of the type in which a vehicle travels on flat tracks on a roadbed, a derail prevention device comprising: a vehicle frame; vertical wheels having pneumatic tires thereon and being bearing mounted on each side of said frame, said frame being adapted to travel in a forward and rearward direction on said wheels and said tires; a pair of spaced, allochiral, inwardly opening, channel-shaped rails secured on a roadbed between said vertical wheels and below said frame; a pair of allochirally arranged non-galling metal brake shoes extending downwardly from said frame, said rails being generally outwardly of said shoes, said shoes extending into respective channel-shaped rails inwardly spaced from a vertical web portion of said channels and under an upper flange portion of said channels, said shoes being spaced from the latter so as to provide a braking action when said frame is lifted a predetermined amount and to prevent the lifting of said frame beyond said predetermined amount; horizontal side wheels having pneumatic tires thereon being bearing mounted and disposed laterally of said frame on opposite sides thereof in contact with the outer sides of respective web portions of said channels for rotation thereon; and an upper surface of an upper flange portion of each of said respective channels providing a return current collecting surface, said rails being insulated from said roadbed.

4. In a railway structure of the type in which a vehicle travels on flat tracks on a roadbed, a derail prevention device comprising: a vehicle frame; vertical wheels having pneumatic tires thereon and being bearing mounted on each side of said frame, said frame being adapted to travel in a forward and rearward direction on said wheels and said tires; a pair of horizontal flat surfaces spaced to be under said vertical wheels to provide a road surface therefor; safety wheels mounted on each side of said frame; each safety wheel being inwardly of a corresponding vertical wheel and being on a common axis therewith, said safety wheels adapted to rotate with corresponding vertical wheels; each safety wheel having an inner retaining flange of larger diameter than said wheel; a pair of horizontal safety wheel tracks spaced to be under corresponding safety wheels on opposite sides of the frame, said safety wheel tracks being on a lower level than said flat surfaces, the lower circumferential surfaces of said vertical wheels and safety wheels outwardly of said flanges being on substantially the same horizontal level, the retaining flanges of said safety wheels being lower than said last horizontal level; a pair of spaced, allochiral, inwardly opening, channel-shaped rails secured on a roadbed between said vertical wheels and below said frame; a pair of allochirally arranged non-galling metal brake shoes extending downwardly from said frame, said rails being generally outwardly of said shoes, said shoes extending into respective channel-shaped rails inwardly spaced from a vertical web portion of said channels and under an upper flange portion of said channels, said shoes being spaced from the latter so as to provide a braking action when said frame is lifted a predetermined amount and to prevent the lifting of said frame beyond said predetermined amount; horizontal side wheels having pneumatic tires thereon mounted and disposed laterally of said frame on opposite sides thereof in contact with the outer sides of respective web portions of said channels for rotation thereon; and an upper surface of an upper flange portion of each of said respective channels providing a return current collecting surface, said rails being insulated from said roadbed.

5. In a railway structure of the type in which a vehicle travels on flat tracks on a roadbed, a derail prevention device comprising: a vehicle frame; vertical wheels bearing mounted on each side of said frame and having lowermost peripheral riding portions, said frame being adapted to travel in a forward and rearward direction on said wheels; braking means extending downwardly from said frame and adapted to extend below a portion of rail means secured on a roadbed between said vertical wheels and below said frame so as to provide a braking action when said frame is lifted a limited amount and to prevent the lifting of said frame beyond said limited amount; horizontal side wheels disposed laterally of said frame on opposite sides thereof and adapted to be in contact with respective sides of said rail means for rotation thereon; and safety wheels mounted on each side of said frame inwardly of said vertical wheels and having lowermost peripheral riding portions, said safety wheels adapted to rotate on the same axis as and with a corresponding vertical wheel, said safety wheels and said vertical wheels having their lowermost peripheral riding portions on substantially the same horizontal level.

References Cited in the file of this patent

UNITED STATES PATENTS

| | | |
|---|---|---|
| 1,012,900 | Norwood | Dec. 26, 1911 |
| 1,682,974 | Lukens | Sept. 4, 1928 |
| 1,748,309 | Rose | Feb. 25, 1930 |
| 1,755,030 | Schmeck | Apr. 15, 1930 |
| 2,042,265 | Main | May 26, 1936 |
| 2,076,914 | Newton | Apr. 13, 1937 |
| 2,348,841 | Oswald | May 16, 1944 |

FOREIGN PATENTS

| | | |
|---|---|---|
| 222,584 | Great Britain | Oct. 6, 1924 |